E. H. N. CLARKSON & W. H. H. KESLER,
Assignors, by mesne Assignments, to F. B. SLOAN & F. S. CLARKSON.
Sash-Cord Guide.
No. 8,586. Reissued Feb. 18, 1879.
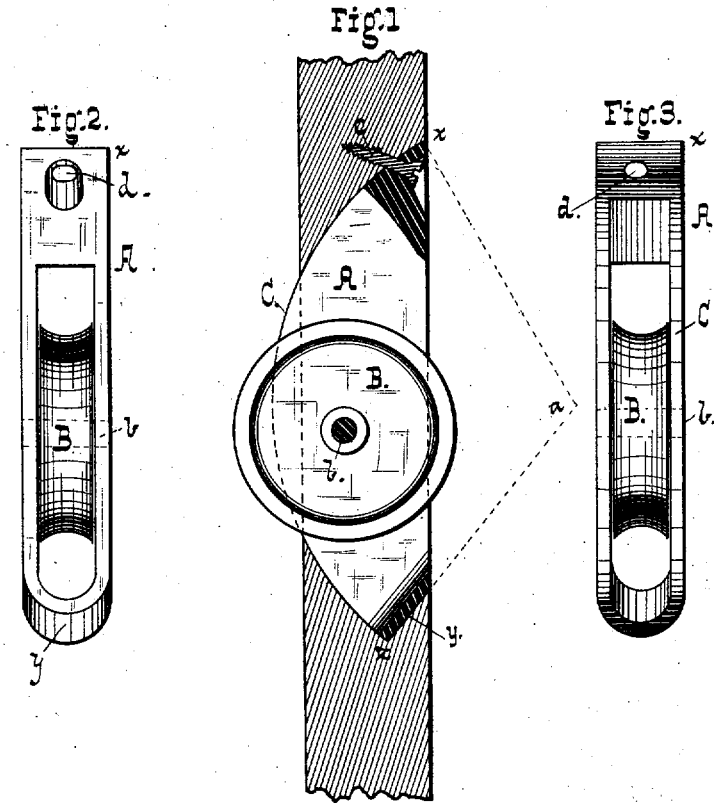
Witnesses,
W. A. Bertram
Dr L. H. Barclay.
Inventors,
Edw. H. N. Clarkson.
William H. H. Kesler.
by R. D. Williams.
Attorney.
N. PETERS, PHOTO-LITHOGRAPHER, WASHINGTON, D. C.

UNITED STATES PATENT OFFICE.

EDWARD H. N. CLARKSON AND WILLIAM H. H. KESLER, OF BALTIMORE, MARYLAND, ASSIGNORS, BY MESNE ASSIGNMENTS, TO FRANK B. SLOAN AND FRANK S. CLARKSON.

IMPROVEMENT IN SASH-CORD GUIDES.

Specification forming part of Letters Patent No. 201,749, dated March 26, 1878; Reissue No. 8,586, dated February 18, 1879; application filed January 3, 1879.

*To all whom it may concern:*

Be it known that we, EDWARD H. N. CLARKSON and WILLIAM H. H. KESLER, both of Baltimore city, State of Maryland, have invented certain new and useful Improvements in Sash-Cord Guides; and we hereby declare the same to be fully, clearly, and exactly described as follows, reference being had to the accompanying drawings, in which—

Figure 1 is a vertical sectional view of the device secured in a window-frame. Fig. 2 is a front view, and Fig. 3 a rear view, of the device.

Our invention relates to what are known as "sash-cord guides" or "sash-pulleys," consisting generally of a metallic casing containing a sheave for the window-cord, and suitably adapted for attachment to the sides of the window-frame; and our said invention consists in a device of the class named, constructed with special reference to a peculiar mode of insertion and attachment, hereinafter described, and possessing certain points of novelty, which will be specifically indicated.

In the accompanying drawings, A is a casing, constructed preferably of cast-iron, containing a sheave, B, mounted upon a pin, *b*. The casing A is of the form shown, having a plane face, which is brought flush with the side of the window-frame, and a rear edge, C, curved in the arc of a circle whose center is without the frame, as at *a*. The lower end of the casing is beveled substantially at right angles with its rear face at *y*, and is rounded, as shown in Figs. 2 and 3, the object of which construction will be presently apparent.

The upper end, *x*, of the casing is provided with a perforation, *d*, for an attaching screw.

The pin *b*, upon which the sheave B is mounted, is farther from the face of the casing than the point *z*, so that the strain brought upon the pin by the sash and weight tends to hold the casing within the frame. In consequence of this arrangement no special fastening device is absolutely needed; but in order to prevent the device from falling out of the frame during transportation, or in case the cord should part, a small screw or nail is preferably inserted through the hole *d*.

The mortise in which the device is inserted is cut by means of a bit which is caused to revolve about its axis, and at the same time is made to turn about a point, *a*, coincident with the center of the circle of which the rear edge of the device is a part when the latter is in place.

The bit is made to enter the frame at the point *x*, and is caused to turn about the center *a* until it has reached the point *z*, when it is withdrawn from the frame. By these means a mortise is cut of the exact shape of the casing A, and has, like it, a rounded bottom.

In a word, the device is constructed to fit a mortise of predetermined size and shape, and its peculiarities of construction have, as hereinbefore stated, a special reference thereto.

It is patent that the same end will be attained by causing the window-frame to suitably revolve about a bit having but one motion—namely, that of revolution about its axis.

As the device is void of flanges, no hand-chiseling whatever is required, and an absolute accuracy of fit in the machine-made mortise is insured.

Having thus described our invention, what we claim as new, and desire to secure by Letters Patent, is—

1. A sash-cord guide having its lower end beveled downward and backward and rounded from side to side, and meeting the rear edge of the device at a point within the window-frame, substantially as described.

2. The sash-cord guide herein described, consisting of the casing A, having rounded and beveled lower end, *y*, and rear edge, C, curved in the arc of a circle, as set forth.

3. The sash-cord guide herein described, having its lower end, *y*, rounded and beveled, as set forth, and having a perforation, *d*, at its upper end, substantially as described.

ED. H. N. CLARKSON.
W. H. H. KESLER.

Witnesses:
R. D. WILLIAMS,
FRANK B. SLOAN.